Patented Oct. 7, 1941

2,257,908

UNITED STATES PATENT OFFICE 2,257,908

PREPARATION OF KETOXIMES

William H. Hill, Mount Lebanon, Pa., and Edward L. Kropa, Stamford, Conn., assignors to American Cyanamid Company, New York, N. Y., a corporation of Maine No Drawing. Application August 27, 1940, Serial No. 354,364

5 Claims. (Cl. 260—566)

This invention relates to an improved method for the preparation of ketoximes.

Oximes have been prepared in the past primarily in laboratory work where it was desired to identify a particular aldehyde or ketone. The customary procedure was to react molecular equivalents of the compound containing a aldehydic or ketonic group and hydroxylamine, recovering and purifying the crystalline precipitate. Although a vast number of reactions were known whereby oximes could be converted into a number of other compounds, little use was made of oximes commercially, for their production by the known laboratory methods was not economically feasible.

We have found that when ketones are dissolved in liquid ammonia and an hydroxylamine salt added, the corresponding ketoximes are formed and remain in solution, while the ammonium salt which is formed is insoluble in liquid ammonia. Filtration and evaporation of the ammonia from the filtrate yields the solid oximes.

According to the present invention we have not only made possible the more efficient preparation of ketoximes generally, but they can now be produced economically on an industrial scale. The reagents used in the process of the present invention are commercially available and need not be of a high degree of purity. In fact, as is indicated above, the oximes are readily isolated in substantially quantitative yields from solution in liquid ammonia in which the ammonium salt is insoluble. This ease and thoroughness of separation is of particular advantage as the product is formed quickly, and as recovered is of sufficient purity for any of the commercial applications to which it is to be adapted. In other words, we have made available to industry an economic process for the preparation of ketoximes, which while known in the laboratory were not exploited commercially in the manufacture of chemicals. This lack of employment of ketoximes heretofore was not for want of their usefulness, but merely due to the high cost of production on a commercial scale.

All of the ketones, both of the aliphatic and aromatic series form oximes with hydroxylamine and the present invention therefore is not limited to any particular class of oxime-forming ketones but broadly includes any substance containing at least one ketonic group. Among the ketones which may be used are those of the saturated aliphatic series such as acetone, butanone, dimethylglyoxal and pinacolone; aralkyl ketones such as acetphenone and aromatic ketones such as benzophenone and benzil. In addition alicyclic ketones such as cyclopentanone and cyclohexanone and substituted ketones such as trichloracetone will give a similar reaction. The various keto sugars such as d-fructose and l-sorbose are also included in this category as they are all hydroxy ketones, as well as the glycosides which on hydrolysis yield their corresponding ketose. It is an advantage of the present invention that it may be applied broadly to the production of any ketoxime.

In carrying out the process of the present invention the ketone is dissolved in liquid ammonia and an equimolecular amount of available hydroxylamine is added. The hydroxylamine may be used as such or in the form of a salt, such as hydroxylamine sulfate, for as has already been pointed out, any ammonium sulfate formed along with the oxime can be readily separated, being insoluble in liquid ammonia whereas the oxime is soluble. The hydroxylamine sulfate used need not be of high purity but the very crudest form gives equally good results. This is especially significant when one considers that the crude sulfate is very acid, and under normal operating conditions it would be necessary to neutralize with caustic or otherwise purify it before reacting it with a ketone. However, the present process eliminates such preliminary conditioning steps for any impurities which the hydroxylamine salt may contain are filtered off along with the ammonia salt, and the oxime is recovered in a pure form from the evaporation of the liquid ammonia. Thus, one can use low grade reactants and still obtain products of high purity and this is of great economic advantage for the crude hydroxylamine costs only one third as much as C. P. hydroxylamine.

The following specific examples are given to illustrate how the process of the present invention may be applied to the preparation of specific ketoximes, but it is not in any way intended to limit the scope of the present invention, and the process can broadly be applied to the preparation of any ketoxime.

Example 1

19.6 g. of cyclohexanone are dissolved in liquid ammonia and 26.2 g. crude hydroxylamine acid sulfate is slowly added. After filtration and evaporation of the ammonia from the filtrate, 16.1 g. of crude cyclohexanone oxime is obtained. A further quantity can be recovered by resuspending the filter cake in liquid ammonia and filtering.

*Example 2*

1 mole of acetone is dissolved in liquid ammonia and 1 mole of crude hydroxylamne acid sulfate is slowly added. On filtration and evaporation of the ammonia from the filtrate, a good yield of acetoxime is obtained. A further quantity can be recovered by resuspending the filter cake in liquid ammonia and filtering.

The invention is not limited to the use of hydroxylamine sulfate to furnish the hydroxylamine, but any other salt or hydroxylamine itself could be used equally as well. Hydroxylamine sulfate, however, being the cheapest form of hydroxylamine on the market, is the economically preferred form, and the invention in a more limited aspect is therefore directed to the use of this salt.

What we claim is:

1. A method of producing ketoximes which comprises reacting a compound included in the group consisting of saturated alkyl, aryl and aralkyl ketones with a member of the group consisting of hydroxylamine and inorganic acid salts thereof in liquid ammonia, filtering and evaporating ammonia from the filtrate.

2. A method of producing ketoximes which comprises reacting a compound included in the group consisting of saturated alkyl, aryl and aralkyl ketones with an inorganic acid hydroxylamine salt in liquid ammonia, filtering and evaporating ammonia from the filtrate.

3. A method of producing ketoximes which comprises reacting a compound included in the group consisting of saturated alkyl, aryl and aralkyl ketones with hydroxylamine sulfate in liquid ammonia, filtering and evaporating ammonia from the filtrate.

4. A method according to claim 3 in which the ketone is cyclohexanone.

5. A method according to claim 3 in which the ketone is acetone.

WILLIAM H. HILL.
EDWARD L. KROPA.